United States Patent
Zhou

(10) Patent No.: US 10,397,340 B2
(45) Date of Patent: Aug. 27, 2019

(54) MULTICAST MIGRATION

(71) Applicant: HANGZHOU H3C TECHNOLOGIES CO., LTD., Zhejiang (CN)

(72) Inventor: Wan Zhou, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 94 days.

(21) Appl. No.: 15/326,106

(22) PCT Filed: Jul. 28, 2015

(86) PCT No.: PCT/CN2015/085349
§ 371 (c)(1),
(2) Date: Jan. 13, 2017

(87) PCT Pub. No.: WO2016/015633
PCT Pub. Date: Feb. 4, 2016

(65) Prior Publication Data
US 2017/0208136 A1    Jul. 20, 2017

(30) Foreign Application Priority Data

Jul. 30, 2014 (CN) .......................... 2014 1 0371533

(51) Int. Cl.
*H04L 12/18* (2006.01)
*H04L 29/08* (2006.01)
*H04L 12/46* (2006.01)

(52) U.S. Cl.
CPC .......... *H04L 67/148* (2013.01); *H04L 12/189* (2013.01); *H04L 12/1886* (2013.01);
(Continued)

(58) Field of Classification Search
None
See application file for complete search history.

(56) References Cited

U.S. PATENT DOCUMENTS 9,014,007 B2 * 4/2015 Bhikkaji ............... H04L 47/125
370/237
9,432,204 B2 * 8/2016 Shen .................... H04L 12/1854
(Continued)

FOREIGN PATENT DOCUMENTS

| CN | 103095546 A | 5/2013 |
|----|-------------|--------|
| CN | 103795636 A | 5/2014 |

OTHER PUBLICATIONS

International Search Report and Written Opinion, International Application No. PCT/CN2015/085349, dated Nov. 10, 2015, pp. 1-7, SIPO.

*Primary Examiner* — Joshua Joo
(74) *Attorney, Agent, or Firm* — Sheppard Mullin Richter & Hampton

(57) ABSTRACT

A Virtual extensible Local Area Network Tunnel Endpoint (VTEP) receives a multicast group state indicator comprising a state attribute associated with a group identifier of a multicast group, wherein the multicast group is a first multicast group or a second multicast group. The VTEP sets a traffic send and receive state regarding a traffic for a destination VxLAN in the multicast group according to the state attribute for the multicast group in the multicast group state indicator. The traffic is migrated from the first multicast group to the second multicast group.

14 Claims, 9 Drawing Sheets

(52) U.S. Cl.
CPC ...... *H04L 12/4633* (2013.01); *H04L 12/4641* (2013.01); *H04L 2012/4629* (2013.01)

(56) References Cited

U.S. PATENT DOCUMENTS

| | | | |
|---|---|---|---|
| 2012/0230332 A1* | 9/2012 | Fernandez Gutierrez | ............ H04L 12/66 370/390 |
| 2013/0128886 A1* | 5/2013 | Shah | ............ H04L 12/185 370/390 |
| 2014/0123212 A1 | 5/2014 | Wanser et al. | |
| 2016/0028557 A1* | 1/2016 | Dong | ............ H04L 12/4641 370/395.53 |
| 2017/0195207 A1* | 7/2017 | Wanser | ............ H04L 63/10 |

\* cited by examiner

MULTICAST MIGRATION

BACKGROUND

The number of Virtual Local Area Networks (VLANs) has become unable to satisfy a demand for VLANs in an existing network due to wide applications of the virtualization technologies. Network virtualization can be extended using the Virtual extensible Local Area Network (VxLAN) technologies so that a sufficient number of virtual networks can be available to thereby satisfy a demand of users. The VxLAN network can include a plurality of VxLAN Tunnel Endpoints (VTEPs), and a plurality of Virtual Machines (VMs) connected with the respective VTEPs, where the respective VMs may belong to different VxLANs.

DETAILED DESCRIPTION OF THE EMBODIMENTS

Figure 1:
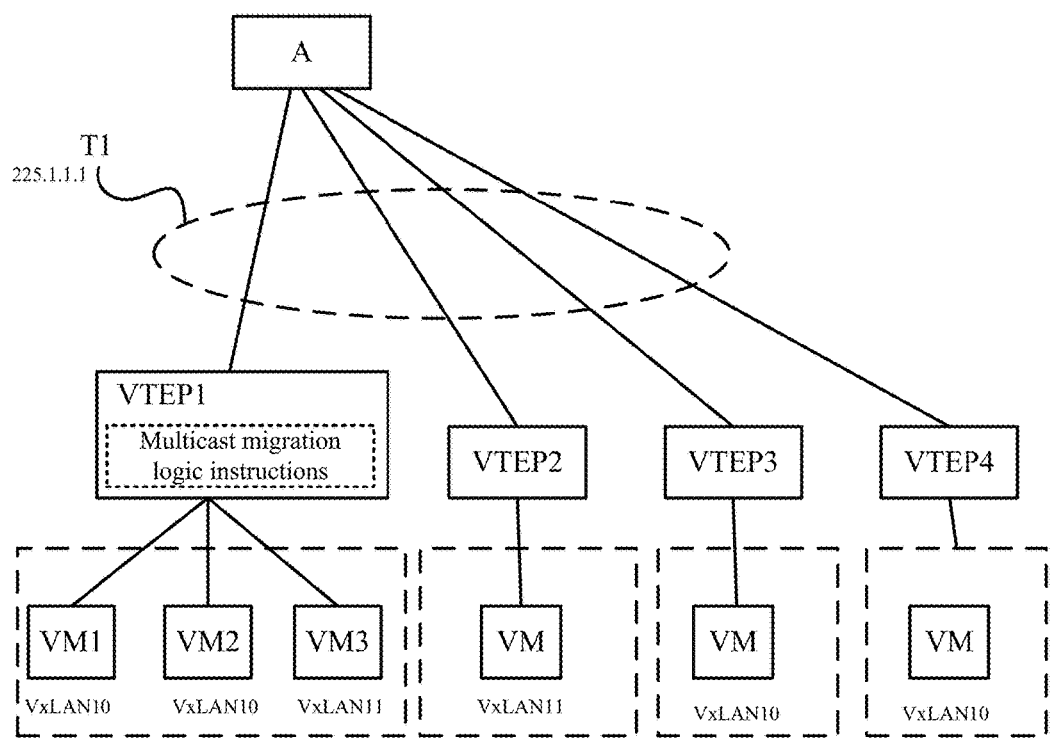
FIG. 1 is a schematic diagram illustrating a system architectural of a VxLAN in accordance with examples of the present disclosure.

FIG. 1 is a schematic diagram illustrating a system architectural of a Virtual extensible Local Area Network (VxLAN) in accordance with examples of the present disclosure. The VxLAN network illustrated in FIG. 1 can include a VTEP1, a VTEP2, a VTEP3, and a VTEP4, where three VMs connected with the VTEP1 include a VM belonging to a VxLAN10, and a VM belonging to a VxLAN11, a VM connected with the VTEP2 belongs to a VxLAN11, and VMs connected with the VTEP3 and the VTEP4 belong to a VxLAN10.

Traffic for the VxLAN10 and the VxLAN11 can be transmitted over a shared multicast transmission channel, and referring to the example in FIG. 1, for example, traffic transmitted to the VxLAN10 can be transmitted over a shared multicast transmission channel T1 including links "A-VTEP1", "A-VTEP2", "A-VTEP3" and "A-VTEP4", where the T1 channel can be a multicast tunnel over which traffic with a multicast IP address of 225.1.1.1, for example, is transmitted. Switch A can represent a switch configured to forward the traffic to the multicast tunnel, that is, the switch A forwards the traffic transmitted to the VxLAN10 to the multicast tunnel, so that the traffic can arrive at the respective VTEPs in FIG. 1, which in turn forward the traffic to the respective corresponding VMs in the VxLAN10. According to a mechanism of the shared multicast transmission channel, traffic for the VxLAN11 can also be forwarded over the multicast tunnel and then received by the VTEP1 to the VTEP4, which in turn forward the traffic to the respective VMs corresponding to the VxLAN11.

As can be apparent from the description above, the respective VTEPs connected by the multicast tunnel T1 (e.g., the VTEP1 to the VTEP4) can join a multicast group with the multicast IP address of 225.1.1.1, so all the VTEP1 to the VTEP4 are members in the multicast group with the multicast address of 225.1.1.1, and the switch A can forward the traffic for the VxLAN simply by forwarding the traffic to the multicast group with the multicast address of 225.1.1.1 so that the respective VTEPs connected by the T1 can receive and further forward the traffic to the VMs in the VxLAN. For example, the VTEP1 forwards the traffic for the VxLAN10 to the VM1 and the VM2 illustrated in FIG. 1 upon reception of the traffic, and forwards the traffic for the VxLAN11 to the VM3 upon reception of the traffic; and the VTEP2 may discard the traffic for the VxLAN10 upon reception of the traffic because there is no connected VM belonging to the VxLAN10.

In order to avoid the traffic for the VxLAN from being received by an unintended VTEP, for example, if the VTEP2 in the example above receives the traffic for the VxLAN10 but has no connected VM belonging to the VxLAN10, then multicast migration can be performed in this disclosure. For example, the traffic for the VxLAN10 is forwarded and migrated to another multicast tunnel for transmission, and the traffic for the VxLAN10 transmitted over the other multicast tunnel will not be received by the uninvolved VTEP (e.g., the VTEP2).

Still taking the VxLAN10 as an example, in the example in FIG. 1, the traffic for the VxLAN10 can be transmitted over the multicast tunnel T1, so that all the VTEP1 to the VTEP4 can receive the traffic transmitted over the T1. In the example in FIG. 2, there may be a new multicast tunnel T2 which can include three links "B-VTEP1", "B-VTEP3" and "B-VTEP4", where the T2 is characterized in that all the three connected VTEPs include the VMs of the VxLAN10, and if flooded traffic for the VxLAN10 is transmitted from the T2, then the traffic will not be received by any uninvolved node (e.g., the VTEP2), so for a tenant of the VxLAN10 (where the respective VMs of the VxLAN10 are allocated to some tenant for use), the level of security of the multicast tunnel T2 will be higher, and also a waste of the bandwidth can be avoided.

For example, the traffic transmitted over the multicast tunnel T2 can include traffic for a multicast group with a multicast IP address of 225.1.1.2, and B can represent a switch transmitting the traffic to the multicast tunnel T2. The VTEP1, the VTEP3 and the VTEP4 can join the multicast group with the multicast address of 225.1.1.2, so that the B can forward the traffic for the VxLAN10 by forwarding the traffic to the multicast group with the multicast address of 225.1.1.2 so that the traffic can be received by the VTEP1, the VTEP3 and the VTEP4 and further forwarded to the corresponding VMs. In the following description, the multicast group with the multicast address of 225.1.1.1 can be referred to as a first multicast group, and the multicast group with the multicast address of 225.1.1.2 can be referred to as a second multicast group. There is a VM, which does not belong to the destination VxLAN (e.g., the VxLAN10), connected with at least one VTEP in the first multicast group (for example, the VM connected with the VTEP2 does not belong to the VxLAN10), and only the VM which does not belong to the destination VxLAN is connected with the VTEP; and each of the VTEPs in the second multicast group includes a VM belonging to the same VxLAN.

Figure 2:
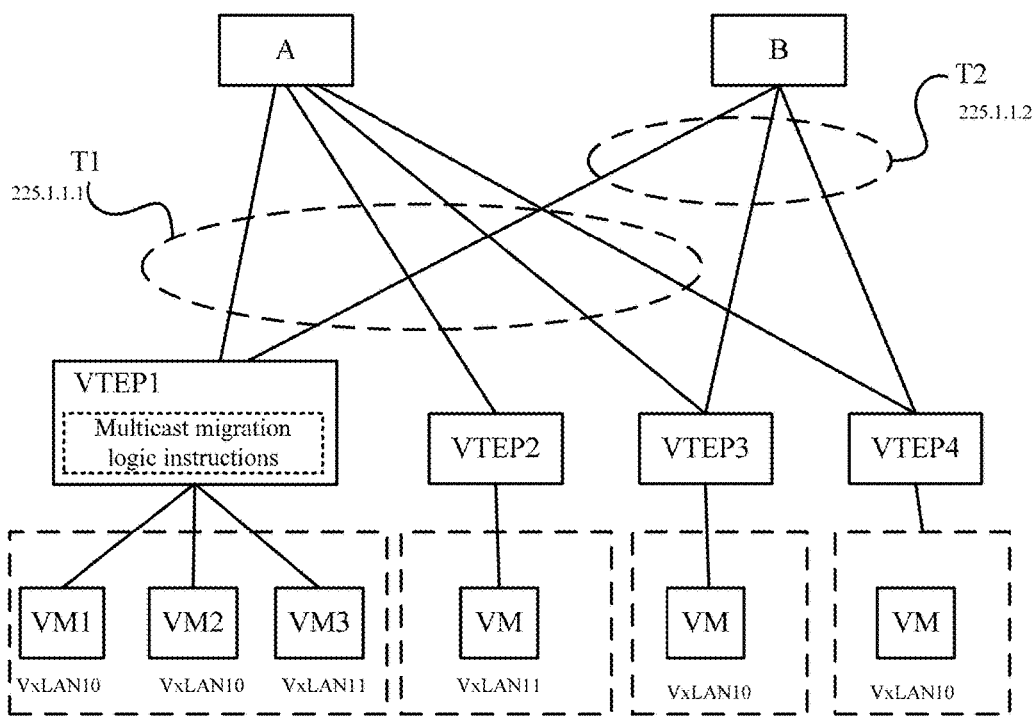
FIG. 2 is a schematic diagram illustrating an application scenario of a multicast migration method in accordance with examples of the present disclosure.

Multicast migration of this disclosure will be described as how the VTEP migrates traffic from the first multicast group to the second multicast group, for example, in order to receive the traffic for the VxLAN10, the VTEP1 joins to the first multicast group (with the multicast IP address of 225.1.1.1) in FIG. 1, and the VTEP1 can exit the first multicast group and join the second multicast group (with the multicast IP address of 225.1.1.2) in FIG. 2, so that B forwards the traffic for the VxLAN10 to the VTEP1 through the second multicast group.

Figure 3:
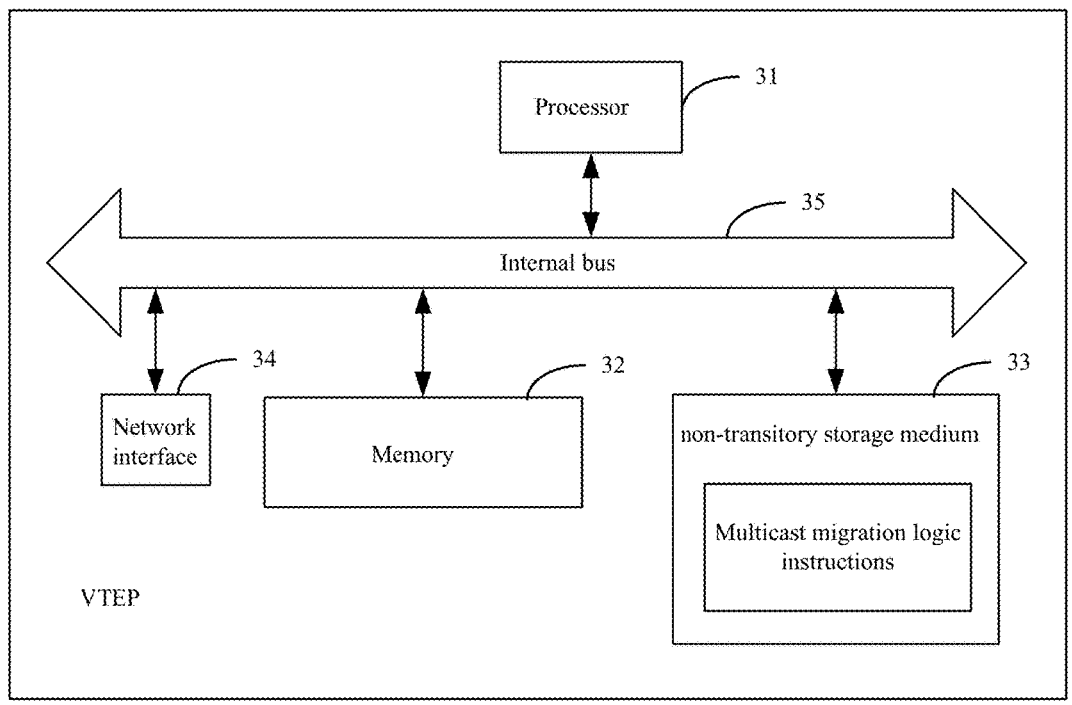
FIG. 3 is a schematic diagram illustrating a structural of a VTEP in accordance with examples of the present disclosure.

In various examples of the present disclosure, the VETP may be a programmable device with a combination of machine readable instructions and hardware. From the aspect of hardware, with reference to FIG. 3, FIG. 3 is a schematic diagram illustrating a structural of a VTEP in accordance with examples of the present disclosure. The VTEP may include a processor 31 such as a central processing unit (CPU), a memory 32, and a non-transitory storage medium 33, such as optical or magnetic drive etc. The non-transitory storage medium 33 may store machine readable instructions that are executable by the processor 31 to perform multicast migration of this disclosure. The machine readable instructions stored in the non-transitory storage medium 33 can be multicast migration logic instructions, and the VTEP may also include a network interface 34, and an internal bus 35, where the processor 31, the memory 32, the non-transitory memory 33, and the network interface 34 can be connected by the internal bus 35. Additionally the VTEP can be a Network Virtualized Edge (NVE) node in a virtualized network, which can function as a VTEP.

Figure 4:
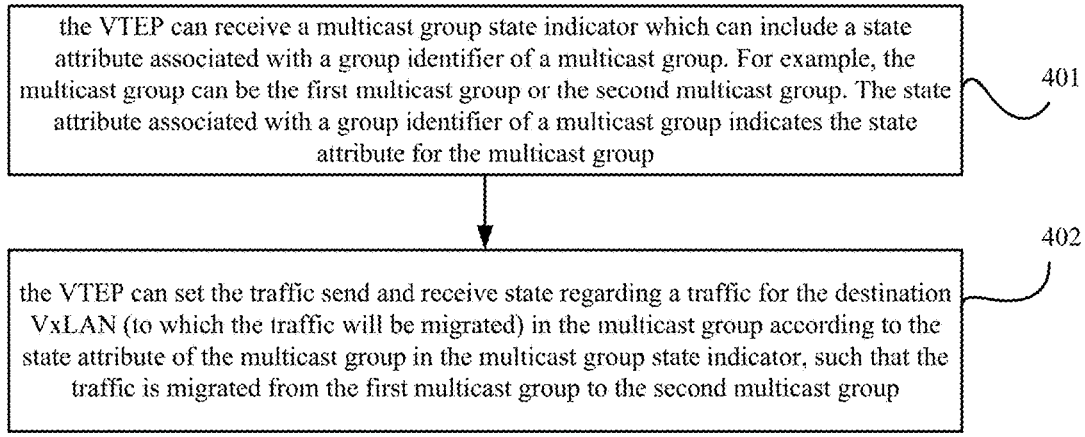
FIG. 4 is a schematic flow chart illustrating a multicast migration method in accordance with examples of the present disclosure.

FIG. 4 illustrates multicast migration performed by the VTEP by executing the multicast migration logic instructions, where for example, the VTEP is one of the respective VTEPs in the second multicast group, e.g., the VTEP1 or the VTEP3 or the VTEP4.

At block 401, the VTEP can receive a multicast group state indicator which can include a state attribute associated with a group identifier of a multicast group. For example, the multicast group can be the first multicast group or the second multicast group. The state attribute associated with a group identifier of a multicast group indicates the state attribute for the multicast group.

In another example, the group identifier can also be included in the multicast group state indicator, for example, the multicast group state indicator can at least include the group identifier of the first multicast group, and the state attribute for the first multicast group. Because the group identifier and the state attribute are all related to the first multicast group, so the state attribute can be called "a state attribute associated with a group identifier".

The state attribute indicates that the multicast group is in a state where traffic can be sent or a state in which traffic can be received, for example, if the multicast group leaves the state where traffic is sent, then the VTEP will not transmit any traffic from the multicast group. By way of an example, if the multicast group corresponding to the VxLAN10 includes the VTEP1, the VTEP3 and the VTEP4, and the multicast IP address of the multicast group is 225.1.1.1, then if the state attribute for the multicast group is that the multicast group leaves the state where traffic is sent, then the respective VTEPs (e.g., the VTEP1) in the multicast group will neither transmit any multicast traffic from the multicast group nor carry the multicast IP address of 225.1.1.1.

It shall be noted that the multicast group state indicator received by the VTEP in 401 is characterized in that the indicator can enable the VTEP to set a traffic send and receive state regarding a traffic, according to the state attribute for the multicast group in the multicast group state indicator. This enables traffic to be migrated from the first multicast group to the second multicast group without any interruption of the traffic.

An example of migration without any interruption of traffic will be described as follows: if the traffic for the VxLAN10 corresponding to the VTEP1, the VTEP3 and the VTEP4 in FIG. 2 initially is transmitted over the first multicast group with the multicast IP address of 225.1.1.1, and is transmitted from the multicast tunnel T1 for transmitting the traffic for the first multicast group, then when the traffic for the VxLAN 10 is migrated to the second multicast group with the multicast IP address of 225.1.1.2 (that is, transmitted from the multicast tunnel T2 corresponding to the second multicast group), if the first multicast group is firstly invalidated, that is, the respective VTEPs exit the first multicast group, and then join the second multicast group, then the multicast traffic of the VTEP1, the VTEP3 and the VTEP4 will be interrupted, for example, the multicast traffic for the VxLAN10 can be neither received nor sent until they join the second multicast group, this means that the multicast traffic is "interrupted" in the process of migration from the first multicast group to the second multicast group. If the respective VTEPs adjust the traffic send and receive state according to the multicast group state indicator received in 401, so that the traffic for the VxLAN 10 will not be interrupted while being migrated, but the state where the multicast traffic can be sent or received will be maintained throughout the migration (that is "without interrupted"), although the state may be maintained by both the first multicast group and the second multicast group. This maintained state where the multicast traffic is sent or received without being interrupted will be referred to as a non-interrupted traffic state, and it also means that the traffic can be migrated between the multicast groups without interrupted.

After the multicast group state indicator is obtained, at block 402, the VTEP can set the traffic send and receive state regarding a traffic for the destination VxLAN (to which the traffic will be migrated) in the multicast group according to the state attribute of the multicast group in the multicast group state indicator, such that the traffic is migrated from the first multicast group to the second multicast group.

After the traffic for the destination VxLAN is migrated to the second multicast group, the traffic will be transmitted over the multicast tunnel for the second multicast group without being transmitted to any uninvolved node, to thereby save a link bandwidth and improve the security in transmission.

Figure 5:
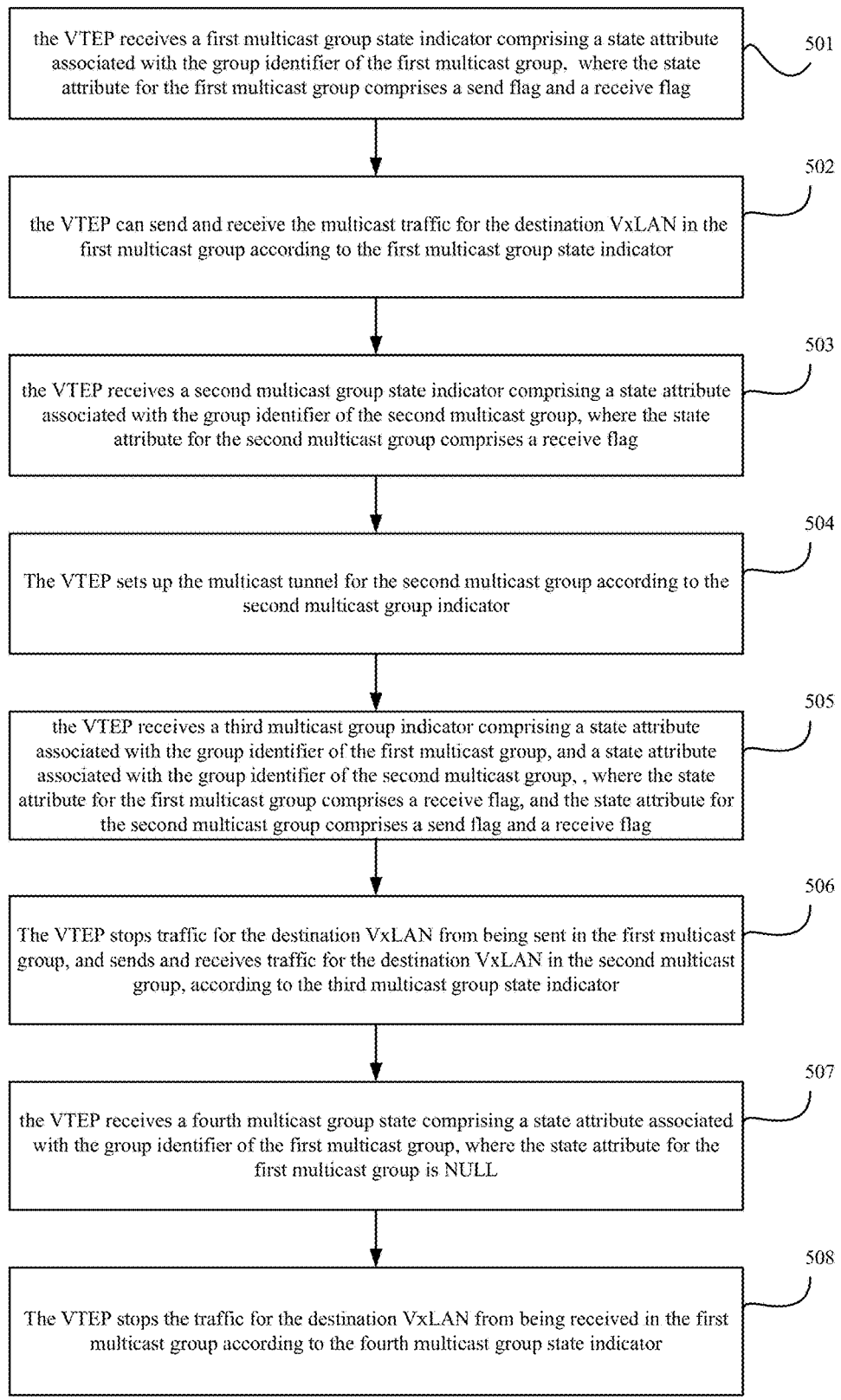
FIG. 5 is a schematic flow chart illustrating another multicast migration method in accordance with examples of the present disclosure.

FIG. 5 illustrates a process in which a VTEP (e.g., the VTEP1 or the VTEP3) sets a traffic send and receive state according to a state attribute to thereby migrate traffic between multicast groups without any interruption. Referring to the example in FIG. 2 where traffic is migrated between the multicast groups, the multicast traffic corresponding to the VTEP1, the VTEP3 and the VTEP4 corresponding to the VxLAN10 in FIG. 2 is migrated from the multicast group with the multicast IP address of 225.1.1.1

(where the flooded traffic for the VxLAN10 is transmitted from the shared tunnel T1) to the multicast group with the multicast IP address of 225.1.1.2 (where the flooded traffic for the VxLAN10 is transmitted from the shared tunnel T2).

At block 501, the VTEP receives a first multicast group state indicator comprising a state attribute associated with the group identifier of the first multicast group, where the state attribute for the first multicast group comprises a send flag and a receive flag.

For example, the respective VTEPs (including the VTEP1, the VTEP3 and the VTEP4) of the VMs of the VxLAN10 will receive a multicast group state indicator, which can be referred in this block to as a first multicast group state indicator to be distinguished from a multicast group state indicator as referred to in later examples.

For example, the first multicast group state indicator can include the state attribute for the firsts multicast group, and the group identifier of the first multicast group. The group identifier can be the multicast IP address of 225.1.1.1, for example. The send flag included in the state attribute for the first multicast group is represented as Send, and the receive flag is represented as Receive, for example. The send flag and the receive flag can alternatively be embodied as other flags, for example, Send is represented as "1", and Receive is represented as "0".

The send flag and the receive flag above will be defined as follows taking the VTEP1 as an example: if the VTEP1 receives the first multicast group state indicator including the send flag of Send corresponding to the first multicast group with the multicast IP address 225.1.1.1, then it indicates that the VTEP1 can send multicast traffic for the multicast group (with the multicast IP address of 225.1.1.1); for example, the VTEP1 can send multicast traffic carrying the multicast IP address of 225.1.1.1 so that the other multicast members VTEP3 and VTEP4 can also receive the traffic. If the receive flag corresponding to the first multicast group with the multicast IP address of 225.1.1.1 is Receive, then it indicates that the VTEP1 can receive multicast traffic transmitted to the VTEP1, e.g., traffic for the VxLAN10, in the multicast group.

As can be apparent, in the example above, the send flag and the receive flag of the multicast group are equivalent to enabling flags that the VTEP can send or receive traffic in the corresponding multicast group, so that if the send flag is set, then the VTEP can send traffic in the corresponding multicast group, and if the receive flag is set, then the VTEP can receive traffic in the corresponding multicast group. On the contrary, if neither the send flag nor the receive flag is set, then the VTEP can neither send nor receive traffic in the corresponding multicast group. Alternatively the send flag and the receive flag can be defined otherwise, for example, the send flag can be represented as "00" and "11", where "00" indicates that no traffic can be sent in the multicast group, and "11" indicates that traffic can be sent in the multicast group, so that the send flag can be set to "00" or "11" to indicate in which of the states the VTEP is (where traffic may or may not be sent). Thus the VTEP can know from the send flag and the receive flag whether traffic can be sent or received in the first multicast group, where the flags are traffic send and receive state indicators.

Additionally the VTEP can receive the multicast group state indicator in a number of ways. In an example, another device can transmit a message carrying the first multicast group state indicator to the VTEP; and in another example, the VTEP can receive the multicast group state indicator configured by an administrator on the VTEP. The multicast group state indicator can be configured by configuring the information to be used in the multicast migration process in batches or issuing a plurality of multicast group state indicators to be used in the multicast migration process at a time, and configuring instances of times when the respective indicators are applied. It will be described taking as an example the administrator configuring on the multicast group state indicators sequentially on the VTEP.

Upon reception of the first multicast group state indicator, the VTEP can send and receive the multicast traffic for the destination VxLAN in the first multicast group according to the first multicast group state indicator at block 502.

For example, the VTEP can set the send and receive states regarding the multicast traffic for the destination VxLAN (e.g., the VxLAN10 in FIG. 2), in the first multicast group with the multicast IP address of 225.1.1.1 according to the send flag and the receive flag included in the first multicast group state indicator received in 501.

Figure 6:
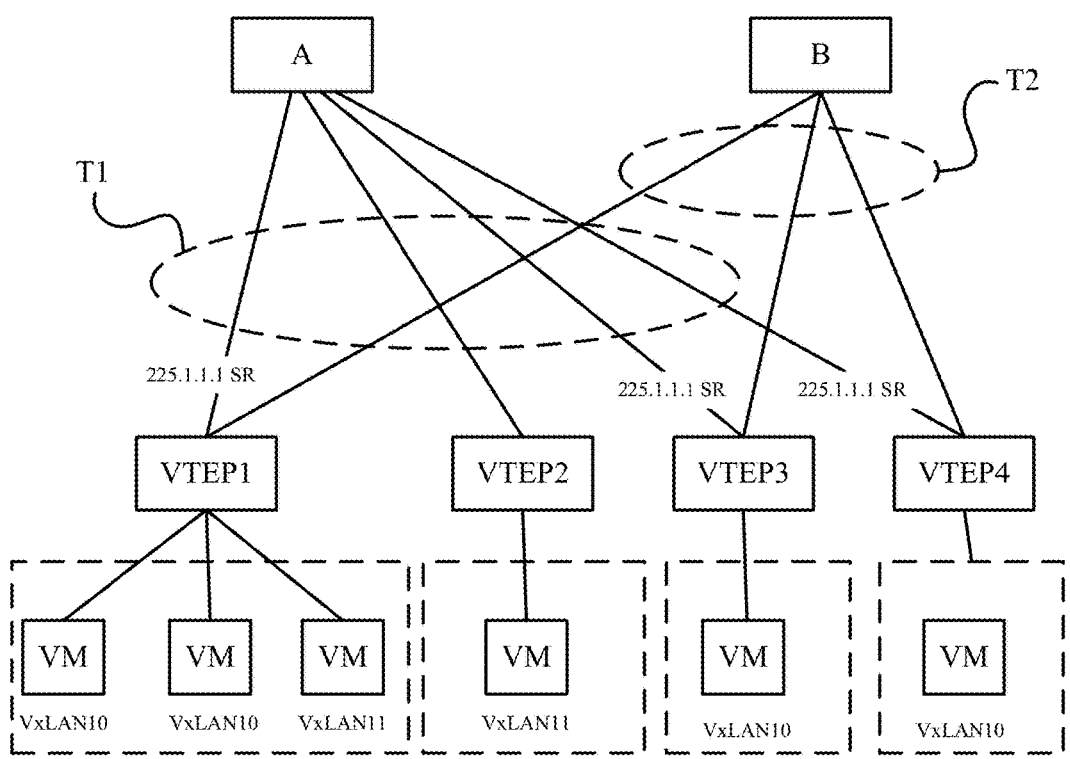
FIG. 6 is a schematic diagram illustrating a first schematic state in a multicast migration in accordance with examples of the present disclosure.

Referring to FIG. 6, there are visualized the send and receive states regarding the current multicast group, where the VTEP1, the VTEP3 and the VTEP4 are configured with the send flag of Send and the receive flag of Receive of the first multicast group with the multicast IP address of 225.1.1.1 (which can be configured by the administrator configuring the attribute of the multicast group on the VTEP to include Send and Receive), the VTEP can send and receive traffic in the first multicast group.

At block 503, the VTEP receives a second multicast group state indicator comprising a state attribute associated with the group identifier of the second multicast group, where the state attribute for the second multicast group comprises a receive flag.

For example, the VTEP receives the second multicast group state indicator (which is the second multicast group state indicator received by the VTEP in the migration flow), which can include the group identifier of the second multicast group, e.g., the multicast IP address of 225.1.1.2; and also the state attribute for the second multicast group, for example, by setting the receive flag of Receive for the second multicast group with the multicast IP address of 225.1.1.2. In this block, the flag of Receive can be set to indicate that the VTEP will be ready for receiving traffic over a multicast tunnel corresponding to the second multicast group with the multicast IP address of 225.1.1.2 so that flooded traffic for the VxLAN10 received by the VTEP1, the VTEP3 and the VTEP4 will be transmitted over the multicast tunnel T2.

The VTEP sets up the multicast tunnel for the second multicast group according to the second multicast group indicator at block 504.

For example, the VTEP can perform a multicast group setup flow according to the second multicast group state indicator upon reception of the indicator. For example, the VTEP announces an Internet Group Management Protocol (IGMP) join message as a multicast member to join the second multicast group with the multicast IP address of 225.1.1.2; and the VTEP can transmit an IGMP query message as a multicast source to set up any source multicast tree corresponding to the second multicast group to thereby set up the multicast tunnel T2 for the second multicast group.

Figure 7:
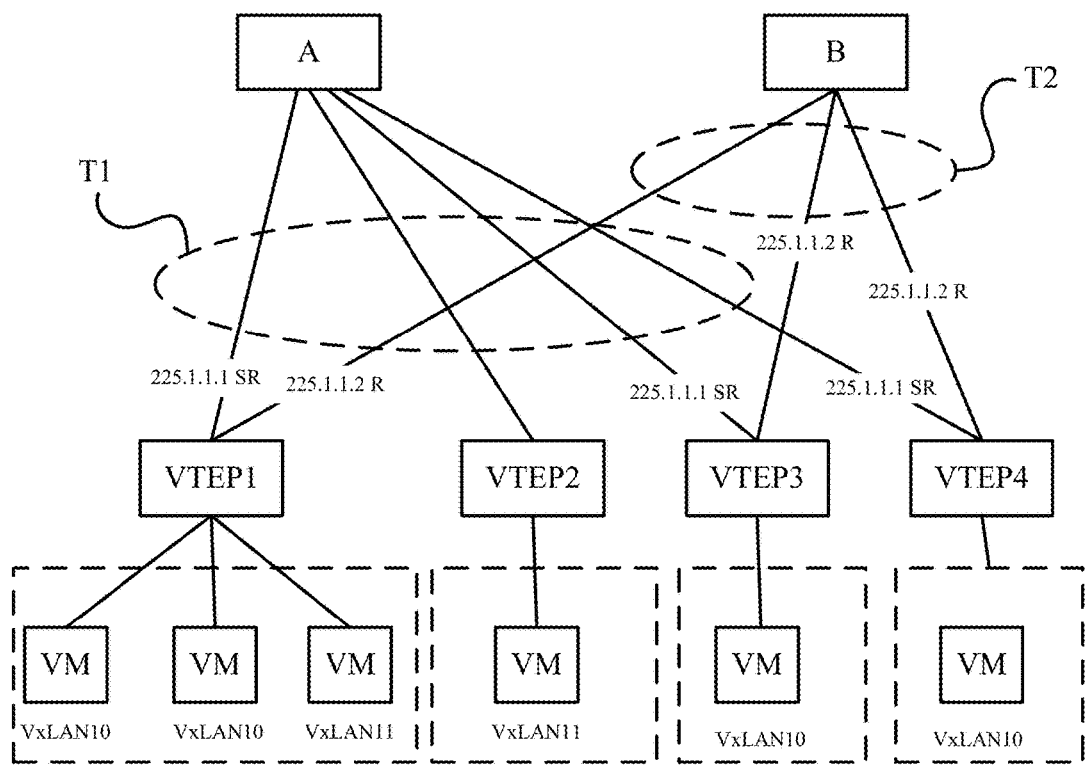
FIG. 7 is a schematic diagram illustrating a second schematic state in a multicast migration in accordance with examples of the present disclosure.

Following the 504, the VTEP1, the VTEP3 and the VTEP4 can receive traffic in both the second multicast group with the multicast IP address of 225.1.1.2 and the first multicast group with the multicast IP address of 225.1.1.1, but since the first multicast group is provided with the attribute of Send, and the second multicast group is provided only with the attribute of Receive, the VTEP can send traffic only in the first multicast group, but can receive traffic in both the first multicast group and the second multicast group, that is, each of the VTEP1, the VTEP3 and the VTEP4 can operate in a uni-send and bi-receive state, for which reference can be made to the schematic state diagram in FIG. 7.

At block 505, the VTEP receives a third multicast group indicator comprising a state attribute associated with the group identifier of the first multicast group, and a state attribute associated with the group identifier of the second multicast group, where the state attribute for the first multicast group comprises a receive flag, and the state attribute for the second multicast group comprises a send flag and a receive flag.

For example, the administrator can further configure the third multicast group indicator on the respective VTEPs, delete the attribute of Send of the first multicast group and keep only the receive flag, and add the send flag to the attribute of the second multicast group in addition to the receive flag.

The VTEP stops traffic for the destination VxLAN from being sent in the first multicast group, and sends and receives traffic for the destination VxLAN in the second multicast group, according to the third multicast group state indicator at block 506.

Figure 8:
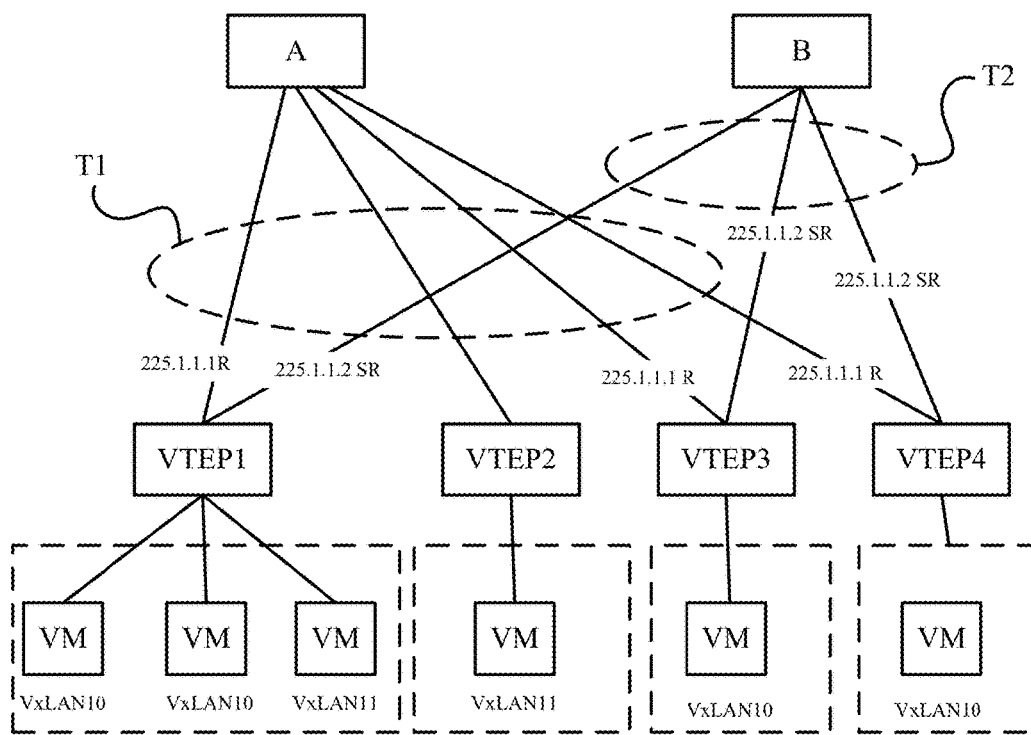
FIG. 8 is a schematic diagram illustrating a third schematic state in a multicast migration in accordance with examples of the present disclosure.

For example, the VTEP can receive flooded traffic from the first multicast group or the second multicast group, but can only send traffic from the second multicast group, for example, forward the flooded traffic for the VxLAN 10 by flooding the traffic from the multicast tunnel for the second multicast group, according to the third multicast group state indicator obtained in 505. At this time the VTEP is still in the uni-send and bi-receive state except that it sends traffic from the second multicast group instead of the first multicast group, for which reference can be made to the schematic state diagram in FIG. 8.

At block 507, the VTEP receives a fourth multicast group state comprising a state attribute associated with the group identifier of the first multicast group, where the state attribute for the first multicast group is NULL.

For example, the VTEP can be configured in this block not to receive the flooded traffic from the multicast tunnel T1 for the original multicast group, that is, the all the traffic corresponding to the VTEP is equivalently migrated from the first multicast group to the second multicast group. At this time the fourth multicast group state indicator can be configured on the VTEP, where the state attribute for the first multicast group is NULL indicating that the attribute of Send and the attribute of Receive, which are set in the several earlier blocks are deleted so that the VTEP stops the traffic from being sent and received from the first multicast group accordingly.

The VTEP stops the traffic for the destination VxLAN from being received in the first multicast group according to the fourth multicast group state indicator at block 508.

Figure 9:
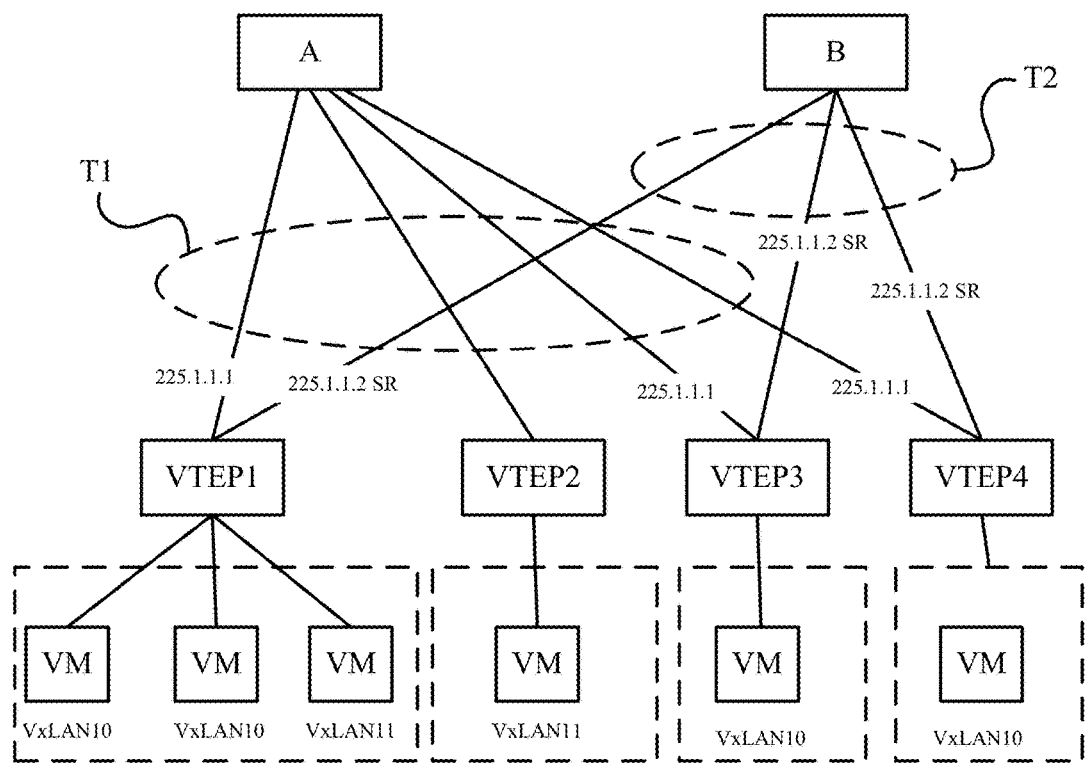
FIG. 9 is a schematic diagram illustrating a fourth schematic state in a multicast migration in accordance with examples of the present disclosure.

For example, the VTEP sets the traffic for the destination VxLAN to be stopped from being received from the first multicast group, and the traffic for the multicast group to be carried over the multicast tunnel T2 for the second multicast group, according to the fourth multicast group indicator, so that the traffic for the VxLAN10 corresponding to the VTEP has been migrated from the first multicast group to the second multicast group, and the flooded traffic for the VxLAN10 is carried from T2, for which reference can be made to the schematic state diagram in FIG. 9. Additionally the VTEP can transmit an Internet Group Management Protocol (IGMP) exit message in the first multicast group so as to exit the first multicast group.

In the multicast migration method of this disclosure, the traffic can be migrated from the multicast group for which the shared tunnel was originally used, to the new multicast group, and the traffic can be transmitted over the multicast tunnel for the new multicast group without being transmitted to any uninvolved node, to thereby avoid a waste of the link bandwidth and improve the security in transmission of the traffic; and as also can be apparent from the description above, the traffic can be migrated between the multicast groups without suddenly interrupting the original multicast group, but the traffic send and receive state of the multicast group can be maintained throughout the migration so that the traffic can be sent or received by both the original multicast group and the new multicast group to thereby migrate the traffic seamlessly without any interruption of the traffic.

If the functions above are embodied in the form of software functional elements and sold or used as a separate product, then the product can be stored in a computer readable storage medium. Based upon such understanding, the technical solution of the disclosure in essence or the part thereof contributing to the prior art or a part of the technical solution can be embodied in the form of a software product stored in a storage medium and including several instructions to cause a computer device (e.g., a personal computer, a server, a network device, etc.) to perform all or a part of the blocks in the methods according to the respective embodiments of the disclosure. The storage medium above can include a U-disk, a mobile hard disk, a Read-Only Memory (ROM), a Random Access Memory (RAM), a magnetic disk, an optical disk or various other medium in which program codes can be stored.

The foregoing disclosure is merely illustrative of preferred embodiments of the disclosure but not o intended to limit the disclosure, and any modifications, equivalent substitutions, adaptations, thereof made without departing from the spirit and scope of the disclosure shall be encompassed in the claimed scope of the appended claims.

The invention claimed is:

1. A multicast migration method, the method comprising:
receiving, by a Virtual extensible Local Area Network Tunnel Endpoint (VTEP), a multicast group state indicator comprising a state attribute associated with a group identifier of a multicast group, wherein the multicast group is a first multicast group or a second multicast group, an the state attribute associated with a group identifier of a multicast group indicates the state attribute for the multicast group; and
setting, by the VTEP, a traffic send and receive state regarding a traffic for a destination Virtual extensible Local Area Network (VxLAN) in the multicast group according to the state attribute for the multicast group in the multicast group state indicator, wherein the traffic send and receive state enables the traffic to be migrated from the first multicast group to the second multicast group.

2. The method according to claim 1, wherein:
said receiving, by the VTEP, a multicast group state indicator comprises:
receiving, by the VTEP, a first multicast group state indicator comprising a state attribute associated with the group identifier of the first multicast group, wherein the state attribute for the first multicast group comprises a send flag and a receive flag; and
said setting, by the VTEP, a traffic send and receive state regarding a traffic for a destination VxLAN in a multicast group comprises:

sending and receiving, by the VTEP, a multicast traffic for the destination VxLAN in the first multicast group according to the first multicast group state indicator.

3. The method according to claim 1, wherein said receiving, by the VTEP, a multicast group state indicator, and said setting, by the VTEP, a traffic send and receive state regarding a traffic for a destination VxLAN in a multicast group respectively comprises:

receiving, by the VTEP, a second multicast group state indicator comprising a state attribute associated with the group identifier of the second multicast group, wherein the state attribute for the second multicast group comprises a receive flag;

setting up, by the VTEP, a multicast tunnel for the second multicast group according to the second multicast group indicator;

receiving, by the VTEP, a third multicast group state indicator comprising a state attribute associated with the group identifier of the first multicast group and a state attribute associated with the group identifier of the second multicast group, wherein the state attribute for the first multicast group comprises a receive flag and the state attribute for the second multicast group comprises a send flag and a receive flag;

stopping, by the VTEP, the traffic for the destination VxLAN from being sent in the first multicast group, and sending and receiving, by the VTEP, the traffic for the destination VxLAN in the second multicast group, according to the third multicast group state indicator;

receiving, by the VTEP, a fourth multicast group state indicator comprising a state attribute associated with the group identifier of the first multicast group, wherein the state attribute for the first multicast group is NULL; and stopping, by the VTEP, the traffic for the destination VxLAN from being received in the first multicast group according to the fourth multicast group state indicator.

4. The method according to claim 3, wherein said stopping, by the VTEP, the traffic for the destination VxLAN from being received in the first multicast group comprises:

transmitting, by the VTEP, an Internet Group Management Protocol (IGMP) exit message in the first multicast group so as to exit the first multicast group, according to the state attribute for the first multicast group.

5. The method of claim 1, wherein the VTEP is applicable to a virtualized network comprising a plurality of VTEPs, and at least one of the VTEPs is only connected with a virtual machine which does not belong to a destination Virtual extensible Local Area Network (VxLAN).

6. A Virtual extensible Local Area Network Tunnel Endpoint (VTEP), comprising a processor and a non-transitory storage medium, the non-transitory storage medium comprising machine readable instructions that are executable by a processor to:

receive a multicast group state indicator comprising a state attribute associated with a group identifier of a multicast group, wherein the multicast group is a first multicast group or a second multicast group, the state attribute associated with a group identifier of a multicast group indicates the state attribute for the multicast group; and set a traffic send and receive state regarding a traffic for a destination Virtual extensible Local Area Network (VxLAN) in the multicast group according to the state attribute for the multicast group in the multicast group state indicator, wherein the traffic send and receive state enables the traffic to be migrated from the first multicast group to the second multicast group.

7. The VTEP according to claim 6, wherein the non-transitory storage medium comprises machine readable instructions that are executable by a processor to:

receive a first multicast group state indicator comprising a state attribute associated with the group identifier of the first multicast group, wherein the state attribute for the first multicast group comprises a send flag and a receive flag; and send and receive a multicast traffic for the destination VxLAN in the first multicast group according to the first multicast group state indicator.

8. The VTEP according to claim 6, wherein the non-transitory storage medium comprises machine readable instructions that are executable by a processor to:

receive a second multicast group state indicator comprising a state attribute associated with the group identifier of the second multicast group, wherein the state attribute for the second multicast group comprises a receive flag; and set up a multicast tunnel for the second multicast group according to the second multicast group indicator;

and receive a third multicast group state indicator comprising a state attribute associated with the group identifier of the first multicast group and a state attribute associated with the group identifier of the second multicast group, wherein the state attribute for the first multicast group comprises a receive flag; and the state attribute for the second multicast group comprises a send flag and a receive flag; and stop the traffic for the destination VxLAN from being sent in the first multicast group, and send and receive the traffic for the destination VxLAN in the second multicast group; and receive a fourth multicast group state indicator comprising a state attribute associated with the group identifier of the first multicast group, wherein the state attribute for the first multicast group is NULL; and stop the traffic for the destination VxLAN from being received in the first multicast group according to the fourth multicast group state indicator.

9. The VTEP according to claim 8, wherein in order to stop the traffic for the destination VxLAN from being received in the first multicast group, the non-transitory storage medium comprises machine readable instructions that are executable by a processor to:

transmit an Internet Group Management Protocol (IGMP) exit message in the first multicast group so as to exit the first multicast group, according to the state attribute for the first multicast group.

10. The VTEP according to claim 6, wherein the VTEP is applicable to a virtualized network comprising a plurality of VTEPs, and at least one of the VTEP is only connected with a virtual machine which does not belong to a destination VxLAN.

11. A non-transitory storage medium storing machine readable instructions that, when executed by a processor of a Virtual extensible Local Area Network Tunnel Endpoint (VTEP), cause the VTEP to perform operations comprising:

receiving, a multicast group state indicator comprising a state attribute associated with a group identifier of a multicast group, wherein the multicast group is a first multicast group or a second multicast group, the state attribute associated with a group identifier of a multicast group indicates the state attribute for the multicast group; and setting a traffic send and receive state regarding a traffic for a destination Virtual extensible Local Area Network (VxLAN) in the multicast group according to the state attribute for the multicast group in the multicast group state indicator, wherein the traffic send and receive state enables the traffic to be migrated from the first multicast group to the second multicast group.

12. The non-transitory storage medium according to claim 11, wherein the operations further comprising:
receiving a first multicast group state indicator comprising a state attribute associated with the group identifier of the first multicast group, wherein the state attribute for the first multicast group comprises a send flag and a receive flag; and
sending and receiving a multicast traffic for the destination VxLAN in the first multicast group according to the first multicast group state indicator.

13. The non-transitory storage medium according to claim 11, wherein the operation further comprising:
receiving a second multicast group state indicator comprising a state attribute associated with the group identifier of the second multicast group, wherein the state attribute for the second multicast group comprises a receive flag; and set up a multicast tunnel for the second multicast group according to the second multicast group indicator; and receiving a third multicast group state indicator comprising a state attribute associated with the group identifier of the first multicast group and a state attribute associated with the group identifier of the second multicast group, wherein the state attribute for the first multicast group comprises a receive flag; and the state attribute for the second multicast group comprises a send flag and a receive flag; and stop the traffic for the destination VxLAN from being sent in the first multicast group, and send and receive the traffic for the destination VxLAN in the second multicast group; and receiving a fourth multicast group state indicator comprising a state attribute associated with the group identifier of the first multicast group, wherein the state attribute for the first multicast group is NULL; and stop the traffic for the destination VxLAN from being received in the first multicast group according to the fourth multicast group state indicator.

14. The non-transitory storage medium according to claim 13, wherein in order to stop the traffic from the destination VxLAN from being received in the first multicast group, the operations further comprising:
transmitting an Internet Group Management Protocol (IGMP) exit message in the first multicast group so as to exit the first multicast group, according to the state attribute for the first multicast group.

* * * * *